(12) United States Patent
Li et al.

(10) Patent No.: US 12,581,320 B2
(45) Date of Patent: Mar. 17, 2026

(54) DATA PROCESSING METHOD, DEVICE AND STORAGE MEDIUM

(71) Applicant: ZTE CORPORATION, Shenzhen (CN)

(72) Inventors: Dapeng Li, Shenzhen (CN); Yin Gao, Shenzhen (CN); Yingjun Zhou, Shenzhen (CN); Zhuang Liu, Shenzhen (CN); Feng Xie, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 511 days.

(21) Appl. No.: 18/011,343

(22) PCT Filed: Jan. 26, 2022

(86) PCT No.: PCT/CN2022/073957

§ 371 (c)(1),
(2) Date: Dec. 19, 2022

(87) PCT Pub. No.: WO2022/199246

PCT Pub. Date: Sep. 29, 2022

(65) Prior Publication Data

US 2023/0308904 A1 Sep. 28, 2023

(30) Foreign Application Priority Data

Mar. 26, 2021 (CN) .......................... 202110327393.7

(51) Int. Cl.
*H04W 24/02* (2009.01)
*H04W 24/08* (2009.01)

(52) U.S. Cl.
CPC ........... *H04W 24/02* (2013.01); *H04W 24/08* (2013.01)

(58) Field of Classification Search
CPC .............................. H04W 24/02; H04W 24/08
See application file for complete search history.

(56) References Cited

U.S. PATENT DOCUMENTS

| | | | | |
|---|---|---|---|---|
| 2019/0179801 | A1* | 6/2019 | Jang ...................... | G06F 16/137 |
| 2019/0251187 | A1* | 8/2019 | Lin ...................... | G06F 16/1834 |
| 2019/0373521 | A1 | 12/2019 | Crawford | |
| 2020/0028688 | A1* | 1/2020 | Takada .................. | H04L 9/3247 |
| 2020/0220712 | A1* | 7/2020 | Han ........................ | H04L 63/12 |
| 2020/0304995 | A1 | 9/2020 | White et al. | |
| 2020/0334629 | A1* | 10/2020 | Karapantelakis ..... | H04W 4/029 |
| 2020/0401383 | A1* | 12/2020 | Singi ..................... | H04L 9/3239 |
| 2023/0024635 | A1* | 1/2023 | Yasuda ................. | H04L 9/3231 |

FOREIGN PATENT DOCUMENTS

| | | |
|---|---|---|
| CN | 111405607 A | 7/2020 |
| CN | 111836269 A | 10/2020 |

OTHER PUBLICATIONS

International Search Report in Application No. PCT/CN2022/073957 dated Apr. 15, 2022, 4 pages including translation.

* cited by examiner

*Primary Examiner* — Michael Thier
*Assistant Examiner* — Tracy Lauren Raimondo
(74) *Attorney, Agent, or Firm* — Morgan, Lewis & Bockius LLP

(57) ABSTRACT

Provided are a data processing method and device, and a storage medium. The method includes: receiving configuration information of a blockchain from a second network element; and putting collected on-chaining information on the blockchain according to the configuration information of the blockchain.

15 Claims, 7 Drawing Sheets

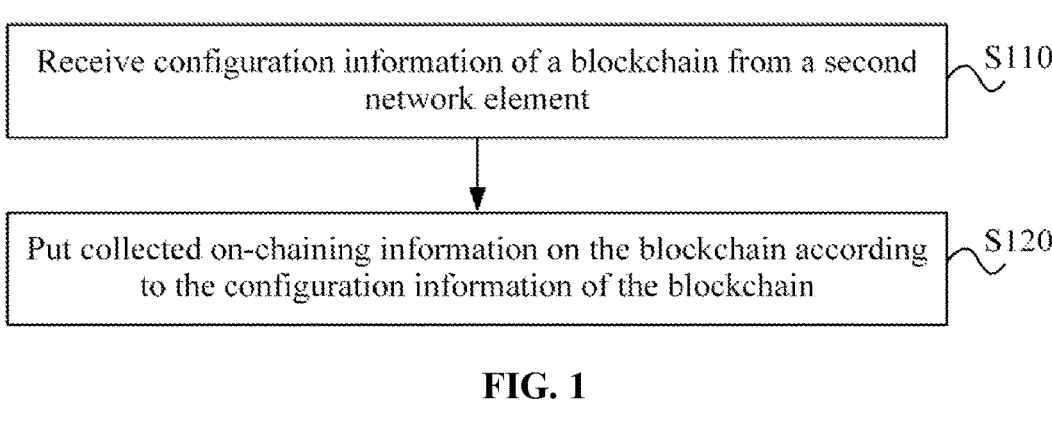

Receive configuration information of a blockchain from a second network element ⟩~S110

Put collected on-chaining information on the blockchain according to the configuration information of the blockchain ⟩~S120

FIG. 1

Send pre-configured configuration information of a blockchain to a first network element ⟩~S210

FIG. 2

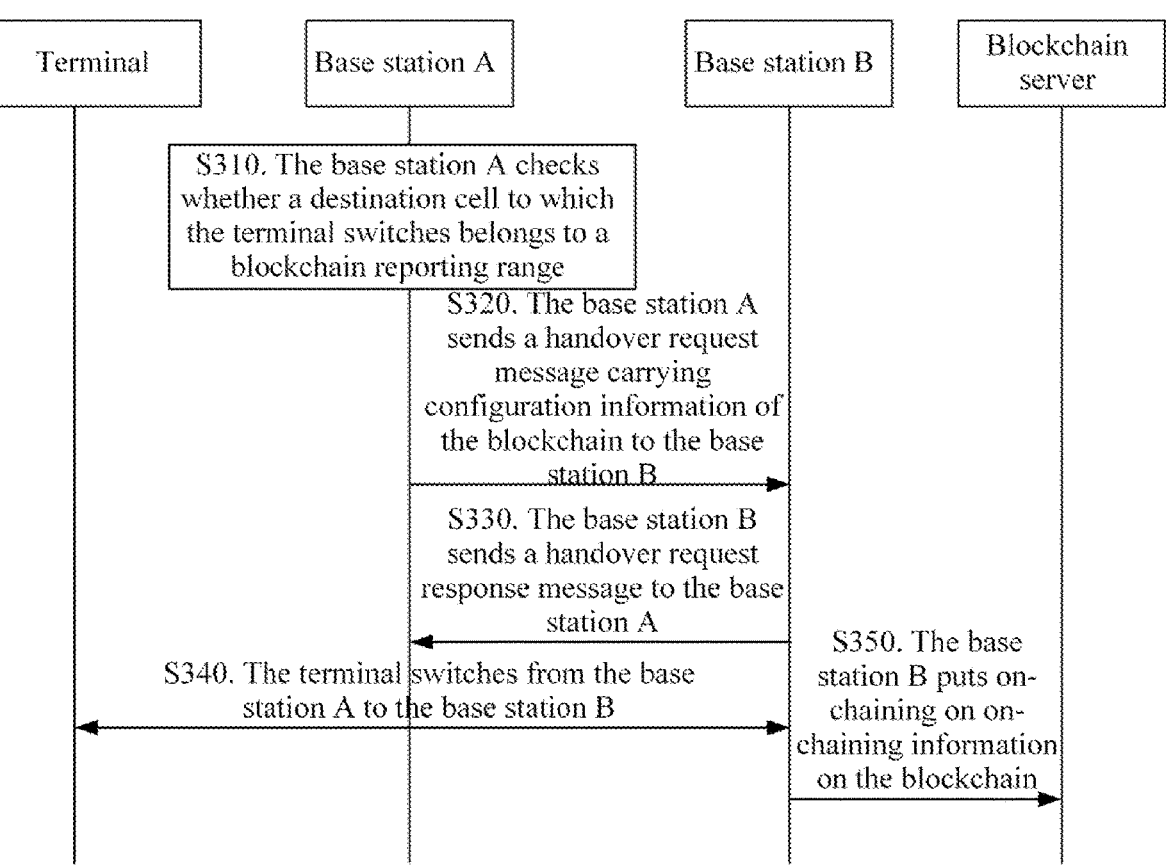

| Terminal | Base station A | Base station B | Blockchain server |

S310. The base station A checks whether a destination cell to which the terminal switches belongs to a blockchain reporting range S320. The base station A sends a handover request message carrying configuration information of the blockchain to the base station B S330. The base station B sends a handover request response message to the base station A S340. The terminal switches from the base station A to the base station B S350. The base station B puts on-chaining on on-chaining information on the blockchain

FIG. 3

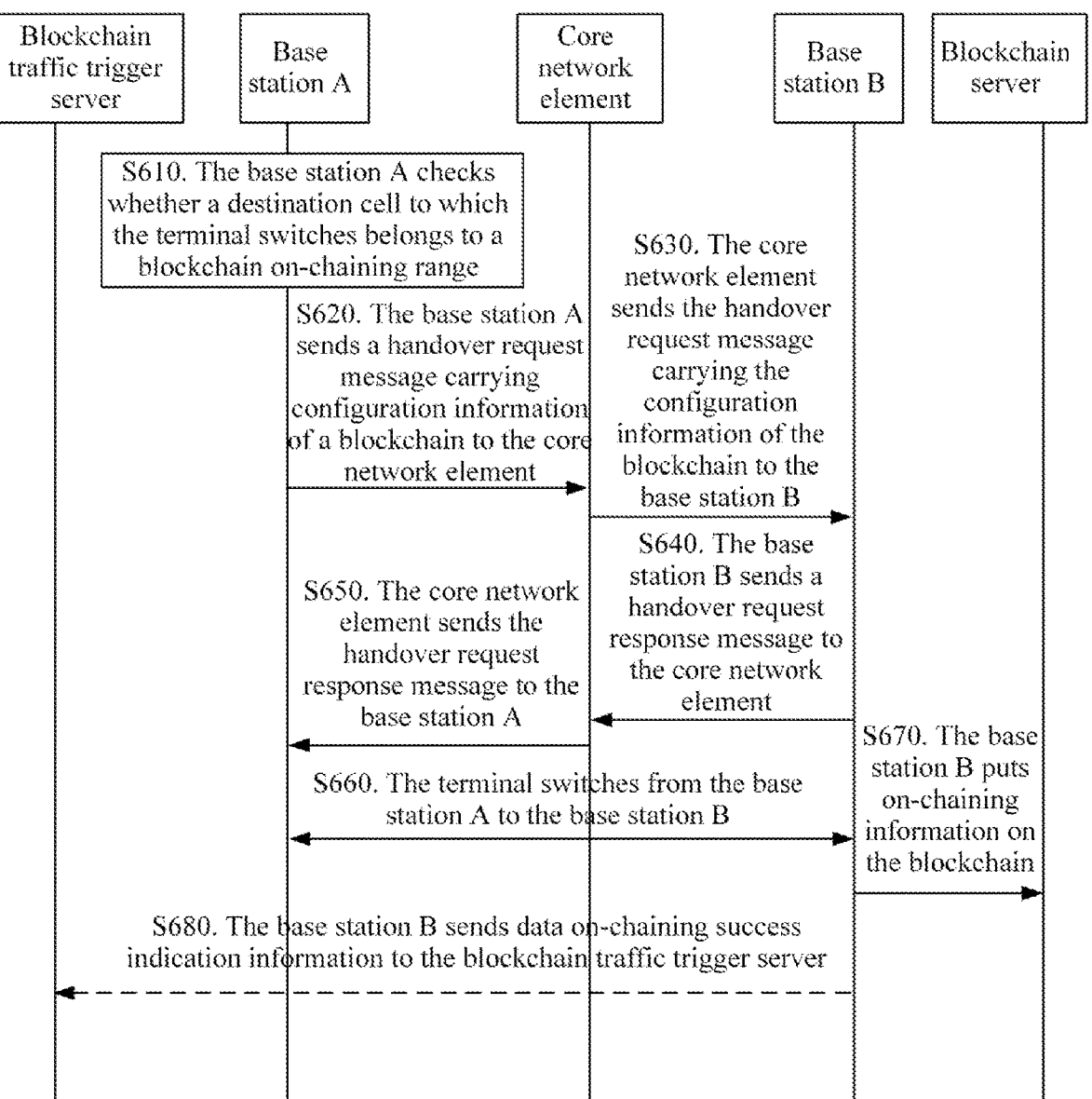

S610. The base station A checks whether a destination cell to which the terminal switches belongs to a blockchain on-chaining range S620. The base station A sends a handover request message carrying configuration information of a blockchain to the core network element S630. The core network element sends the handover request message carrying the configuration information of the blockchain to the base station B S640. The base station B sends a handover request response message to the core network element S650. The core network element sends the handover request response message to the base station A S660. The terminal switches from the base station A to the base station B S670. The base station B puts on-chaining information on the blockchain S680. The base station B sends data on-chaining success indication information to the blockchain traffic trigger server

FIG. 6

DATA PROCESSING METHOD, DEVICE AND STORAGE MEDIUM

CROSS REFERENCE TO RELATED APPLICATIONS

This is a National Stage Application filed under 35 U.S.C. 371, based on International Patent Application No. PCT/CN2022/073957 filed on Jan. 26, 2022, which is based on claims priority to Chinese Patent Application No. 202110327393.7 filed with the China National Intellectual Property Administration (CNIPA) on Mar. 26, 2021, the disclosures of which are incorporated herein by reference in their entireties.

TECHNICAL FIELD

The present application relates to the field of communications, and in particular, to a data processing method and device, and a storage medium.

BACKGROUND

With the wide application of blockchain, the mainstream operators at home and abroad actively explore the application of blockchain in the communication system and find that the consortium blockchain is the most suitable for the application scenario of operators, and the two mainstream applications are 5G edge computing and 5G co-construction and sharing. The distributed nature of blockchain tends to be consistent with the edge computing architecture, and the combination of blockchain and the edge device node is beneficial to the resource complementation and the expansion of new services. In terms of co-construction and sharing, since untrusted multi-party devices are required to participate and cooperate, the blockchain technology may be adopted to achieve trusted data sharing, and the application scenarios involved include roaming settlement, data sharing, resource allocation, operation and maintenance management, and the like. Since the communication nodes supporting blockchain on-chaining may move in the network, how to keep the continuity and integrity of measurement data information on-chaining when the communication nodes move is an urgent problem to be solved.

SUMMARY

In view of the above, embodiments of the present application provide a data processing method and device, and a storage medium, so as to ensure the continuity and integrity of the on-chaining information in a case where the second-type communication node moves, thereby achieving the storage of trusted information in the moving scenario.

The embodiments of the present application provide a data processing method. The method is applied by a first network element and includes the following.

Configuration information of a blockchain is received from a second network element.

Collected on-chaining information is put on the blockchain according to the configuration information of the blockchain.

The embodiments of the present application provide a data processing method. The method is applied by a second network element and includes the following.

Pre-configured configuration information of a blockchain is sent to a first network element.

The embodiments of the present application provide a data processing apparatus. The apparatus is applied in a first network element and includes a receiver and an on-chaining module.

The receiver is configured to receive configuration information of a blockchain from a second network element.

The on-chaining module is configured to put collected on-chaining information on the blockchain according to the configuration information of the blockchain.

The embodiments of the present application provide a data processing apparatus. The apparatus is applied in a second network element and includes a sender.

The sender is configured to send pre-configured configuration information of a blockchain to a first network element.

The embodiments of the present application provide a data processing device. The device includes a communication module, a memory, and one or more processors.

The communication module is configured to perform communication interaction among nodes.

The memory is configured to store one or more programs.

The one or more programs, when executed by the one or more processors, enable the one or more processors to implement the method of any one of the preceding embodiments.

The embodiments of the present application provide a storage medium. The storage medium is configured to store a computer program, and the computer program, when executed by a processor, implements the method of any one of the preceding embodiments.

BRIEF DESCRIPTION OF DRAWINGS

FIG. 1 is a flowchart of a data processing method according to an embodiment of the present application;

FIG. 2 is a flowchart of another data processing method according to an embodiment of the present application;

FIG. 3 is a schematic diagram of interaction of blockchain on-chaining based on inter-base station interface handover according to an embodiment of the present application;

FIG. 6 is a schematic diagram of interaction of blockchain on-chaining success indication reporting based on interface handover between the base station and the core network element according to an embodiment of the present application;

DETAILED DESCRIPTION

Figure 4:
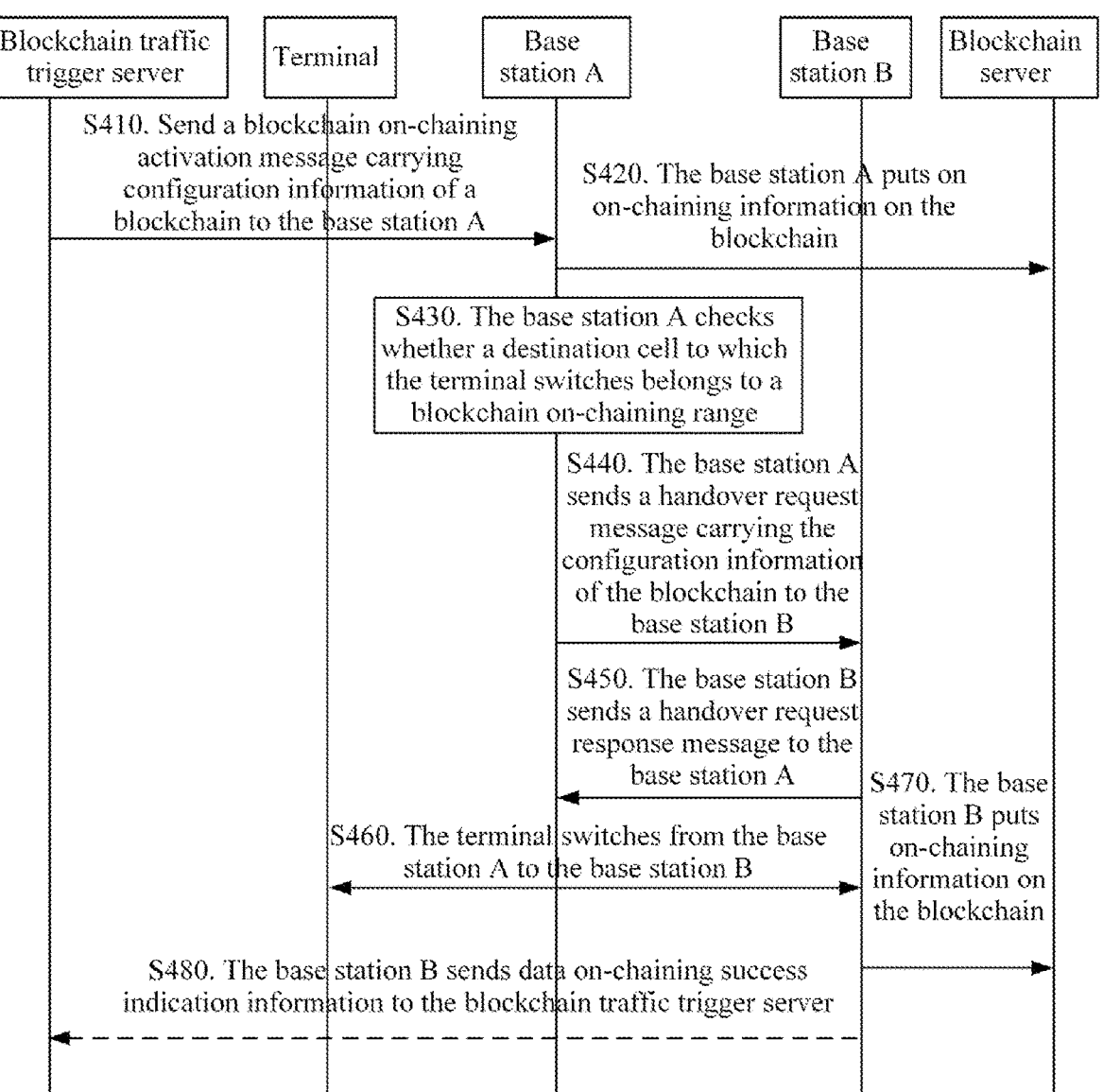
FIG. 4 is a schematic diagram of interaction of blockchain on-chaining success indication reporting based on inter-base station interface handover according to an embodiment of the present application.

The embodiments of the present application are described below in conjunction with drawings. The present application will be described in conjunction with the drawings of embodiments, and the embodiments described hereinafter are intended to explain the present application and not to limit the scope of the present application.

A blockchain is a distributed ledger technology originated from Bitcoin and has various advantages such as great safety, transparence and unmodifiability. Such a technology stores data through a block-chain structure and achieves the update and synchronization of data using a node consensus mechanism. The consensus mechanism is the core part of blockchain technology and can enable distributed nodes who distrust each other reach a consensus on certain information. The main process of the consensus mechanism is that when a new block is added, some nodes are required to keep accounts and other nodes are required to perform verification, and when the verification passes, it means that the nodes reach a consensus, so as to achieve trusted data storage. On this basis, the encryption technology is used to ensure that the data on the blockchain cannot be forged and tampered with. A smart contract is a segment of program codes recorded on the blockchain. Through the smart contract, the data stored on the blockchain can be automatically operated, thereby ensuring the strict implementation of an established rule. The blockchain can be divided into three categories, including public blockchains, consortium blockchains, and private blockchains. Participants of the public blockchain include all people, and any user may read and write data, conduct transactions and confirm consensus. The consortium blockchain only allows members of the consortium to participate, the member institutions run one or more nodes, and the read and write of data and the transaction permission are executed according to the rules of the consortium. The write permission in the private blockchain is only in the hands of one organization, and thus the private blockchain is generally applied within the enterprise.

The distributed ledger technology is applied to data traceability, especially in the field of product data traceability. When the distributed ledger technology is used for product data traceability, the product data may be shared, copied and synchronized among network member nodes. One network member node stores the generated product data in a distributed ledger and synchronizes the product data with other network member nodes so that other network member nodes that have the permission may read the product data, ensuring the uniqueness and tamper resistance of the data.

The distributed ledger technology is based on the blockchain structure. The blockchain is formed by connecting the composed blocks through a chain structure, and each block includes generation time, a current block root hash value, a previous block root hash value, and contained records. In the blockchain-based information traceability system, the information to be traced is added to the blockchain in sequence. When the information is added to the blockchain, a unique identity document (ID) of the information is generated. In the traceability information inquiry, the traceability information is inquired in the blockchain, and the uniqueness of the ID of the product is confirmed. Each blockchain participant holds all blockchains, and new information added by any participant is synchronized to blockchains held by other participants. Similarly, a participant may view the information added by other participants in the blockchain to achieve traceability.

In recent years, the blockchain technology has been gradually applied to various fields of industry, and the application of blockchain in the communication system is an emerging trend.

The radio access network includes base stations and terminals, and the terminals support the blockchain on-chaining of data and the storage of trusted information. Considering that the terminal supporting the blockchain on-chaining may move in the network, in order to ensure the integrity of data continuously, the on-chaining information is required to be provided by different base stations according to the movement of the terminals. In addition, the terminal may enter a radio resource control (RRC) inactive state from an RRC connected state. When the terminal re-accesses the network, the base station accessing the terminal is required to acquire blockchain on-chaining configuration information from the base station accessing the terminal entering the RRC inactive state. In addition to the mobility problem in the same radio system, the terminal may also move from one radio system to another radio system, so how to perform blockchain on-chaining on the on-chaining information when the terminal crosses radio access systems is also an urgent problem to be solved.

In view of the above, the embodiments of the present application provide a data processing method, so as to achieve the object that the base station can keep the continuity of the on-chaining of the on-chaining information in a case where the terminal moves, thereby achieving the storage of trusted information in the moving scenario.

In an embodiment, FIG. 1 is a flowchart of a data processing method according to an embodiment of the present application. This embodiment may be executed by a first network element. The first network element may be a network side. For example, the first network element may include a base station, a blockchain service trigger server, a core network element, and the like. In this embodiment, the implementation process of blockchain on-chaining continuity is described below using an example where the first network element is a base station. As shown in FIG. 1, this embodiment includes S110 and S120.

In S110, configuration information of a blockchain is received from a second network element.

In S120, collected on-chaining information is put on the blockchain according to the configuration information of the blockchain.

The on-chaining information refers to measurement data information, that is, the quantity information that needs to be measured. In an embodiment, after the first network element receives the configuration information of the blockchain from the second network element, the first network element performs data collection on on-chaining information according to configuration information of the blockchain and performs blockchain on-chaining on the collected on-chaining information according to the configuration information of the blockchain so that a first-type communication node can continuously perform on-chaining on the local blockchain measurement data and/or the blockchain measurement data reported by the terminal into a blockchain server in a case where a second-type communication node moves, thereby ensuring the continuity and integrity of the on-chaining information and achieving the storage of trusted information in the moving scenario. The first-type communication node refers to a base station, and the second-type communication node refers to a terminal, for example, the second-type communication node may be a user equipment. It is to be noted that the blockchain measurement data is the on-chaining information described in this embodiment.

In an embodiment, the data processing method applied by the first network element further includes: data on-chaining success indication information is generated, and the data on-chaining success indication information is sent to a server or a node that initiates a blockchain on-chaining session.

In an embodiment, after the first network element successfully completes the blockchain on-chaining on the on-chaining information, the first network element generates the corresponding data on-chaining success indication information and sends the data on-chaining success indication information to the server that initiates the blockchain on-chaining session or the node that initiates the blockchain on-chaining session.

In an embodiment, the configuration information of the blockchain includes one of the following parameters:

a blockchain on-chaining service type;
the blockchain reporting range;
a blockchain on-chaining service content;
a blockchain on-chaining session identity;
a blockchain on-chaining format;
a blockchain server Internet Protocol (IP) address list and/or a blockchain node list;
a correspondence between a blockchain server device identity or blockchain server address and on-chaining information; and
a server IP address that initiates a blockchain on-chaining session or a node that initiates the blockchain on-chaining session. In an embodiment, the blockchain on-chaining service type may include one of: a first-type communication node or a second-type communication node. The first-type communication node refers to a base station, and the second-type communication node refers to a terminal, for example, the second-type communication node may be a user equipment.

In an embodiment, the blockchain reporting range includes at least one of the following parameters: a cell list, a tracking area (TA) list, a tracking area identity (TAI) list, a network slicing list, and a radio access technology (RAT) type. In an embodiment, the RAT type is related to the communication technology, for example, if the communications technology is 4G, the RAT type is Long Term Evolution (LTE), and if the communication technology is 5G, the RAT type is New Radio (NR).

In an embodiment, in a case where the blockchain on-chaining service type is a first-type communication node, the blockchain on-chaining service content includes at least one of the following: cell load information, a cell spectrum utilization rate, and the number of second-type communication nodes. In an embodiment, the number of second-type communication nodes may include the number of terminals in the RRC connected state, and may also include the number of terminals in the RRC idle state.

In an embodiment, in a case where the blockchain on-chaining service type is a second-type communication node, the blockchain on-chaining service content includes at least one of the following:

reference signal received power (RSRP) or reference signal received quality (RSRQ) measured by the second-type communication node;
an uplink delay measured by the second-type communication node;
an uplink packet loss rate measured by the second-type communication node;

a physical resource block (PRB) resource that is occupied by the second-type communication node and that is measured by a first-type communication node;
an uplink and downlink message delay of the second-type communication node measured by the first-type communication node;
an uplink and downlink packet loss rate of the second-type communication node measured by the first-type communication node;
a throughput efficiency of the second-type communication node measured by the first-type communication node; and
a total uplink and downlink data amount of the second-type communication node measured by the first-type communication node. In an embodiment, the blockchain on-chaining service content refers to the data information to be measured by the first-type communication node or second-type communication node.

In an embodiment, the blockchain on-chaining format includes one or a combination of the following parameters: an information on-chaining frequency, an on-chaining information format, an on-chaining block size, and an on-chaining encryption key. In an embodiment, the information on-chaining frequency may include one of the following: periodical on-chaining and event-triggered on-chaining. The event-triggered on-chaining refers to blockchain on-chaining of on-chaining information when a specified event is triggered. In an embodiment, the on-chaining information format includes one of the following: American Standard Code for Information Interchange (ASCII), binary, a file, and a data structure.

In an embodiment, FIG. 2 is a flowchart of another data processing method according to an embodiment of the present application. This embodiment may be executed by a second network element. The second network element may be a network side. For example, the second network element may include a base station and a core network element. In this embodiment, the implementation process of blockchain on-chaining continuity is described below using an example where the second network element is a base station. As shown in FIG. 2, the data processing method provided in this embodiment includes S210.

In S210, pre-configured configuration information of a blockchain is sent to a first network element.

In an embodiment, the data processing method applied by the second network element further includes: before the pre-configured configuration information of the blockchain is sent to the first network element, whether a destination cell of a second-type communication node is within a blockchain reporting range is determined. The second-type communication node may refer to a terminal.

In an embodiment, the operation that the pre-configured configuration information of the blockchain is sent to the first network element further includes the following.

In a case where the destination cell of the second-type communication node is within the blockchain reporting range, the pre-configured configuration information of the blockchain is sent to the first network element.

In an embodiment, before the second network element sends the pre-configured configuration information of the blockchain to the first network element, the second network element checks whether the destination cell to which the terminal switches belongs to a blockchain reporting range. If the destination cell switched by the terminal is not within the blockchain reporting range, the second network element does not provide the configuration information of the blockchain to the first network element. In a case where the destination cell switched by the terminal is within the blockchain reporting range, the second network element sends the pre-configured configuration information of the blockchain to the first network element; the first network element receives the configuration information of the blockchain from the second network element, collects data according to the configuration information of the blockchain as on-chaining information, and puts the on-chaining information on the blockchain according to the configuration information of the blockchain; after the first network element successfully completes the blockchain on-chaining on the on-chaining information, the first network element sends data on-chaining success indication information and sends the data on-chaining success indication information to the server that initiates the blockchain on-chaining session or a node that initiates the blockchain on-chaining session.

In an embodiment, the configuration information of the blockchain includes one of the following parameters:

a blockchain on-chaining service type;

the blockchain reporting range;

a blockchain on-chaining service content;

a blockchain on-chaining session identity;

a blockchain on-chaining format;

a blockchain server IP address list and/or a blockchain node list;

a correspondence between a blockchain server device identity or blockchain server address and on-chaining information; and a server IP address that initiates a blockchain on-chaining session or a node that initiates the blockchain on-chaining session.

In this embodiment, for the explanation of the parameters in the configuration information of the blockchain, reference may be made to the description in the preceding embodiments, and details will not be repeated here.

In an embodiment, FIG. 3 is a schematic diagram of interaction of blockchain on-chaining based on inter-base station interface handover according to an embodiment of the present application. In this embodiment, the blockchain on-chaining continuity is described below based on an inter-base station interface handover manner using an example where the first network element is a base station B, the second network element is a base station A and the second-type communication node is a terminal. As shown in FIG. 3, this embodiment includes S310 to S350.

In S310, a base station A checks whether a destination cell to which the terminal switches belongs to a blockchain reporting range.

Before S310, in a case where the base station A serves a certain terminal, the base station A receives configuration information of the blockchain. The base station A collects on-chaining information of the base station itself and/or on-chaining information of the terminal according to the configuration information of the blockchain and sends the on-chaining information to a blockchain server.

The base station A determines that the terminal needs to switch to the base station B through measurement feedback information of the terminal. The base station A may obtain the identity of the destination cell on the base station B to which the terminal switches through the information of measurement on the terminal. The attribute information of the cell may be obtained according to the information interaction between base stations. For example, the attribute information includes: a TA of a cell, a TAI list, a supported operator, and a supported network slice. The base station A determines whether the destination cell is within the blockchain reporting range through the preceding attribute information and the blockchain reporting range in the configuration information of the blockchain. If the destination cell is not within the blockchain reporting range, the base station A does not send the configuration information of the blockchain to the base station B. If the destination cell is within the blockchain reporting range, the base station A sends a handover request message carrying the configuration information of the blockchain to the base station B.

In S320, the base station A sends a handover request message carrying configuration information of the blockchain to a base station B.

In an embodiment, the handover request message may use an inter-base station interface message. For example, the inter-base station interface message may include a message of an X2 interface or a message of an Xn interface. Alternatively, the handover request message may also use a new message.

In an embodiment, the configuration information of the blockchain includes one of the following parameters: a blockchain on-chaining service type, the blockchain reporting range, a blockchain on-chaining service content, a blockchain on-chaining session identity, a blockchain on-chaining format, a blockchain server IP address list and/or a blockchain node list, a correspondence between a blockchain server device identity or blockchain server address and on-chaining information, and a server IP address that initiates a blockchain on-chaining session or a node that initiates the blockchain on-chaining session.

In an embodiment, the blockchain reporting range includes one or a combination of the following parameters: a cell list, a TA list, a TAI list, a network slicing list, and a RAT type (such as LTE or NR).

In an embodiment, if the blockchain on-chaining service type is a base station, the blockchain on-chaining service content may include one or a combination of the following: cell load information, a cell spectrum utilization rate or the number of terminals (for example, the number of terminals in the RRC connected state, and the number of terminals in the RRC_INACTIVE.

If the blockchain on-chaining service type is a terminal, the blockchain on-chaining service content may include one or a combination of the following: a downlink pilot signal strength RSRP/RSRQ measured by terminal; an uplink delay measured by the terminal; an uplink packet loss rate measured by the terminal; a PRB resource that is occupied by the terminal and that is measured by the base station; an uplink and downlink message delay of the terminal measured by the base station; an uplink and downlink packet loss rate of the terminal measured by the base station; a throughput efficiency of the terminal measured by the base station; and a total uplink and downlink data amount of the terminal measured by the base station.

In an embodiment, the blockchain on-chaining format includes one or a combination of the following: an information on-chaining frequency (periodical on-chaining or event-triggered on-chaining), an on-chaining information format (ASCII, binary, a file or a data structure), an on-chaining block size, and an on-chaining encryption key.

In an embodiment, both the blockchain technology and the directed acyclic graph (DAG) technology belong to the distributed ledger technology (DLT). The method using the blockchain technology in the embodiments of the present application may also be replaced by method using the DAG technology, and at this point, the blockchain server becomes a DAG server.

If the blockchain on-chaining system adopts the DAG technology, at this point, the combination of address of the blockchain server IP address list may correspond to the combination of DAG nodes respectively. The blockchain on-chaining service content, such as the cell load information, may only be reported to IP addresses of part of blockchain servers.

In S330, the base station B sends a handover request response message to the base station A.

In an embodiment, if the base station B cannot execute the operation in the configuration information of the blockchain carried in the handover request message, it is necessary to indicate in the handover request response message that the base station B cannot support the blockchain on-chaining function of all or part of the information.

The handover request response message may use an inter-base station interface message such as an X2 interface message or an Xn interface message, and may also use a new message.

In S340, a terminal switches from the base station A to new base station B.

In S350, the base station B puts the on-chaining information to the blockchain.

In an embodiment, the base station B performs data collection according to the configuration information of the blockchain in the handover request message.

For example, in a case where the blockchain on-chaining service type is a base station, information such as the load information of the base station, the spectrum utilization rate of the base station and the like are collected according to the indication of the blockchain on-chaining service content in the configuration information of the blockchain.

For example, in a case where the blockchain on-chaining service type is a terminal, the base station triggers an RRC measurement process and obtains data from the access stratum (AS) layer of the terminal. When the base station configures the terminal to perform data collection through an RRC protocol message, the configuration information of the blockchain obtained by the base station may be sent to the terminal. If the blockchain on-chaining service content is included in the configuration information of the blockchain, after the AS layer of the terminal obtains the configuration information of the blockchain, the AS layer of the terminal executes the measurement in the configuration information of the blockchain and collects data as the on-chaining information. For example, the blockchain on-chaining service content includes a downlink pilot signal strength RSRP/RSRQ measured by the terminal. If the blockchain on-chaining format is included in the configuration information of the blockchain and if the configuration information of the blockchain contains the on-chaining encryption key, after the AS layer of the terminal obtains the configuration information of the blockchain, the AS layer of the terminal encrypts the collected data according to the on-chaining encryption key.

In the data collection process, according to the indication of the blockchain on-chaining format, the base station performs data collection based on the data acquisition granularity of the configuration information of the blockchain, requires a data structure according to the configuration information of the blockchain, and encrypts the data to form a data set.

The data set contains the blockchain on-chaining session identity in the configuration information of the blockchain, and the blockchain on-chaining session identity is used for distinguishing different blockchain on-chaining services. It is to be noted that the data information in the data set is the on-chaining information in the preceding embodiments.

After the data set is generated, on-chaining is performed on the data set according to the correspondence between a blockchain server device identity or blockchain server address and on-chaining information as well as the blockchain server IP address list and/or the blockchain node list, thereby ensuring the blockchain on-chaining continuity in the process of the inter-base station interface handover.

In an embodiment, FIG. 4 is a schematic diagram of interaction of blockchain on-chaining success indication reporting based on inter-base station interface handover according to an embodiment of the present application. In this embodiment, the process of reporting the blockchain on-chaining success indication is described below based on an inter-base station interface handover manner using an example where the first network element is a base station B, the second network element is a base station A and the second-type communication node is a terminal. As shown in FIG. 4, this embodiment includes S410 to S480.

In S410, the blockchain service trigger server sends a blockchain on-chaining activation message carrying configuration information of the blockchain to the base station A.

The blockchain service trigger server may be a network management system, a base station, a core network element, mobile edge computing (MEC) or a third-party network device. The configuration information of the blockchain is included in the blockchain on-chaining activation message. For the explanation of the configuration information of the blockchain, reference may be made to the description in the preceding embodiments, and details will not be repeated here.

In S420, the base station A performs blockchain on-chaining on on-chaining information.

In this embodiment, for the explanation of the process of performing the blockchain on-chaining on the on-chaining information, reference may be made to the description in S350 in the preceding embodiments, and details will not be repeated here.

In S430, the base station A checks whether a destination cell to which the terminal switches belongs to a blockchain reporting range.

In S440, the base station A sends a handover request message carrying configuration information of the blockchain to the base station B.

In S450, the base station B sends a handover request response message to the base station A.

In S460, the terminal switches from the base station A to the new base station B.

In S470, the base station B performs blockchain on-chaining on on-chaining information.

In this embodiment, for the explanation of S430 to S470, reference may be made to the description of S310 to S350 in the preceding embodiments, and details will not be repeated here.

In S480, the base station B sends data on-chaining success indication information to the blockchain service trigger server.

In an embodiment, when the blockchain on-chaining of the on-chaining information succeeds, the base station B sends an information on-chaining success indication to the blockchain service trigger server according to the server IP address that initiates the blockchain on-chaining session or the node that initiates the blockchain on-chaining session in the configuration information of the blockchain. This embodiment ensures the reporting of blockchain on-chaining success indication information in the process of inter-base station interface handover.

Figure 5:
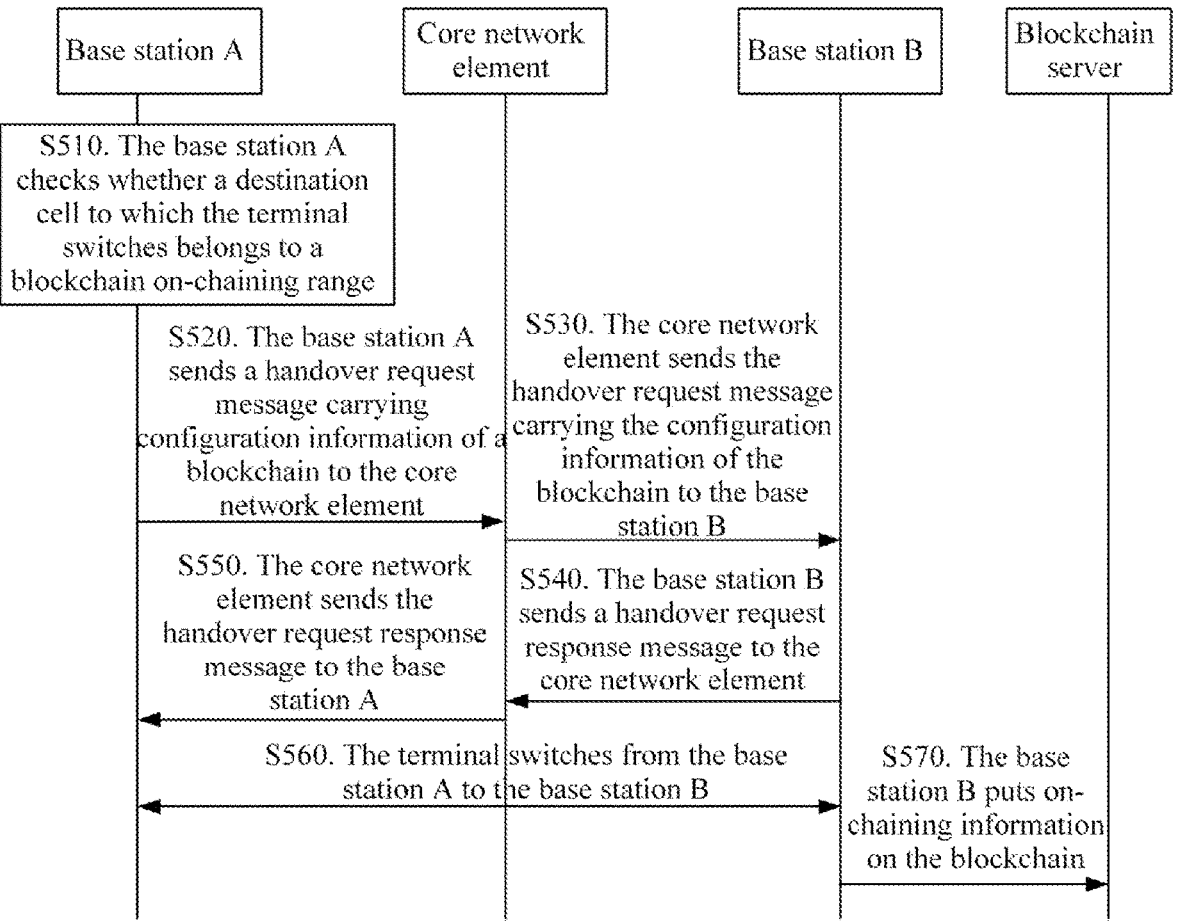
FIG. 5 is a schematic diagram of interaction of blockchain on-chaining based on interface handover between the base stations and the core network element according to an embodiment of the present application.

In an embodiment, FIG. 5 is a schematic diagram of interaction of blockchain on-chaining based on interface handover between the base station and the core network element according to an embodiment of the present application. In this embodiment, the blockchain on-chaining continuity is described below based on a manner of interface handover between the base stations and the core network element using an example where the first network element is a base station B, the second network element is a base station A and the second-type communication node is a terminal. As shown in FIG. 5, this embodiment includes S510 to S570.

In S510, the base station A checks whether a destination cell to which the terminal switches belongs to a blockchain reporting range.

In this embodiment, for the explanation of S510, reference may be made to the description of S310 in the preceding embodiments, and details will not be repeated here.

In S520, the base station A sends a handover request message carrying configuration information of the blockchain to the core network element.

The handover request message may use an NG interface message or an S1 interface message, and may also use a new message.

In S530, the core network element sends the handover request message carrying configuration information of the blockchain to the base station B.

The handover request message may use an NG interface message or an S1 interface message, and may also use a new message.

In S540, the base station B sends a handover request response message to the core network element.

In an embodiment, if the base station B cannot execute the operation in the configuration information of the blockchain carried in the handover request message, it is necessary to indicate in the handover request response message that the base station B cannot support the blockchain on-chaining function of all or part of the information.

The handover request response message may use an inter-base station interface message such as an S1 interface message or an NG interface message, and may also use a new message.

In S550, the core network element sends the handover request response message to the base station A.

In S560, the terminal switches from the base station A to the new base station B.

In this embodiment, for the explanation of S560, reference may be made to the description of S340 in the preceding embodiments, and details will not be repeated here.

In S570, the base station B puts on-chaining information on the blockchain.

In this embodiment, for the explanation of S570, reference may be made to the description of S350 in the preceding embodiments, and details will not be repeated here. In this embodiment, the collected on-chaining information is put on the blockchain according to the correspondence between a blockchain server device identity or blockchain server address and the on-chaining information as well as the blockchain server IP address list and/or the blockchain node list, thereby ensuring the blockchain on-chaining continuity in the process of the interface handover between the base station and the core network element.

In an embodiment, FIG. 6 is a schematic diagram of interaction of blockchain on-chaining success indication reporting based on interface handover between the base station and the core network element according to an embodiment of the present application. In this embodiment, the process of reporting the blockchain on-chaining success indication is described below based on a manner of interface handover between the base station and the core network element using an example where the first network element is a base station B, the second network element is a base station A and the second-type communication node is a terminal. As shown in FIG. 6, this embodiment includes S610 to S680.

In S610, the base station A checks whether a destination cell to which the terminal switches belongs to a blockchain reporting range.

In this embodiment, for the explanation of S610, reference may be made to the description of S310 in the preceding embodiments, and details will not be repeated here.

In S620, the base station A sends a handover request message carrying configuration information of the blockchain to a core network element.

The handover request message may use an NG interface message or an S1 interface message, and may also use a new message.

In S630, the core network element sends the handover request message carrying the configuration information of the blockchain to the base station B.

The handover request message may use an NG interface message or an S1 interface message, and may also use a new message.

In S640, the base station B sends a handover request response message to the core network element.

In an embodiment, if the base station B cannot execute the operation in the configuration information of the blockchain carried in the handover request message, it is necessary to indicate in the handover request response message that the base station B cannot support the blockchain on-chaining function of all or part of the information.

The handover request response message may use an inter-base station interface message such as an S1 interface message or an NG interface message, and may also use a new message.

In S650, the core network element sends the handover request response message to the base station A.

In S660, the terminal switches from the base station A to the new base station B.

In this embodiment, for the explanation of S660, reference may be made to the description of S340 in the preceding embodiments, and details will not be repeated here.

In S670, the base station B puts on-chaining information on the blockchain.

In this embodiment, for the explanation of S670, reference may be made to the description of S350 in the preceding embodiments, and details will not be repeated here.

In S680, the base station B sends data on-chaining success indication information to the blockchain service trigger server.

The blockchain service trigger server refers to a server that initiates a blockchain on-chaining session. In an embodiment, after the on-chaining of the on-chaining information succeeds, the base station B sends an information on-chaining success indication to the blockchain service trigger server according to the server IP address that initiates the blockchain on-chaining session or the node that initiates the blockchain on-chaining session in the configuration information of the blockchain.

Figure 7:
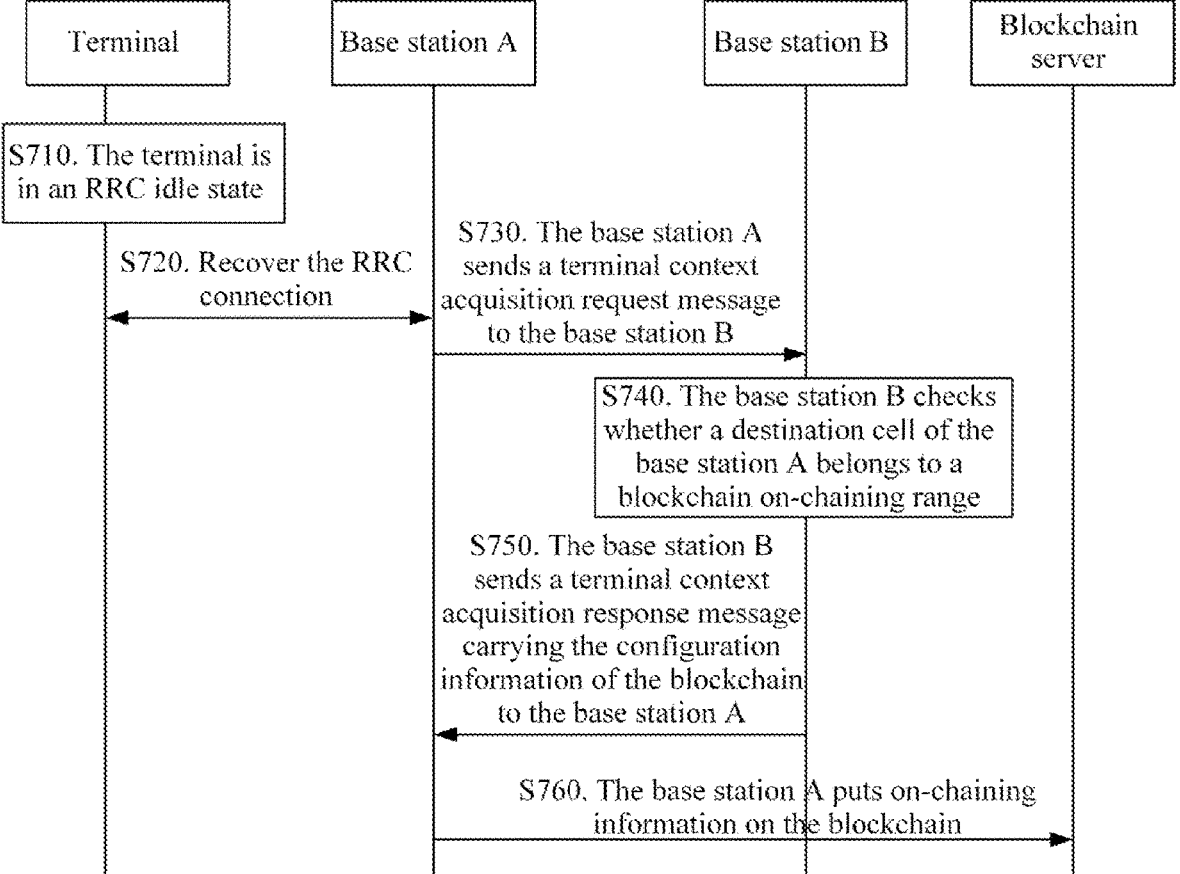
FIG. 7 is a schematic diagram of interaction of blockchain on-chaining in a scenario where a terminal is recovered from an RRC idle state according to an embodiment of the present application.

In an embodiment, FIG. 7 is a schematic diagram of interaction of blockchain on-chaining in a scenario where a terminal is recovered from an RRC idle state according to an embodiment of the present application. In this embodiment, the process of the interaction of blockchain on-chaining in a scenario where the terminal is recovered from the RRC idle state is described below using an example where the first network element is a base station B, the second network element is a base station A and the second-type communication node is a terminal. As shown in FIG. 7, this embodiment includes S710 to S760.

In S710, the terminal is in an RRC idle state.

In an embodiment, before S710, the terminal serves the base station B. When the terminal is in an RRC connected state, the base station B receives the configuration information of the blockchain. The base station B collects on-chaining information of the base station itself and/or on-chaining information of the terminal according to the configuration information of the blockchain and sends the on-chaining information to a blockchain server. In a case where the terminal enters the RRC idle state from the RRC connected state, the base station B stops performing information on-chaining on the terminal. After the base station B receives the configuration information of the blockchain, the base station B sends a terminal information on-chaining termination indication to the blockchain service trigger server according to the server IP address that initiates the blockchain on-chaining session or the node that initiates the blockchain on-chaining session in the configuration information of the blockchain.

In S720, the RRC connection is recovered.

In an embodiment, in a case where the terminal moves to the coverage area of the base station A, the terminal re-accesses the network and enters the RRC connected state.

In S730, the base station A sends a terminal context acquisition request message to the base station B.

The terminal context acquisition request message may use an inter-base station interface message such as an X2 interface message or an Xn interface message, and may also use a new message.

In S740, the base station B checks whether a destination cell of the base station A belongs to a blockchain reporting range.

In this embodiment, for the explanation of S740, reference may be made to the description of S310 in the preceding embodiments, and details will not be repeated here.

In S750, the base station B sends a terminal context acquisition response message carrying configuration information of the blockchain to the base station A.

In an embodiment, the terminal context acquisition response message may use an inter-base station interface message such as an X2 interface message or an Xn interface message, and may also use a new message.

In S760, the base station A puts on-chaining information on the blockchain.

In an embodiment, the base station A continues to execute the reporting of terminal information, for example, the base station A initiates RRC measurement. The base station A sends a terminal information on-chaining recovery indication to the blockchain service trigger server according to the server IP address that initiates the blockchain on-chaining session or the node that initiates the blockchain on-chaining session in the configuration information of the blockchain.

Figure 8:
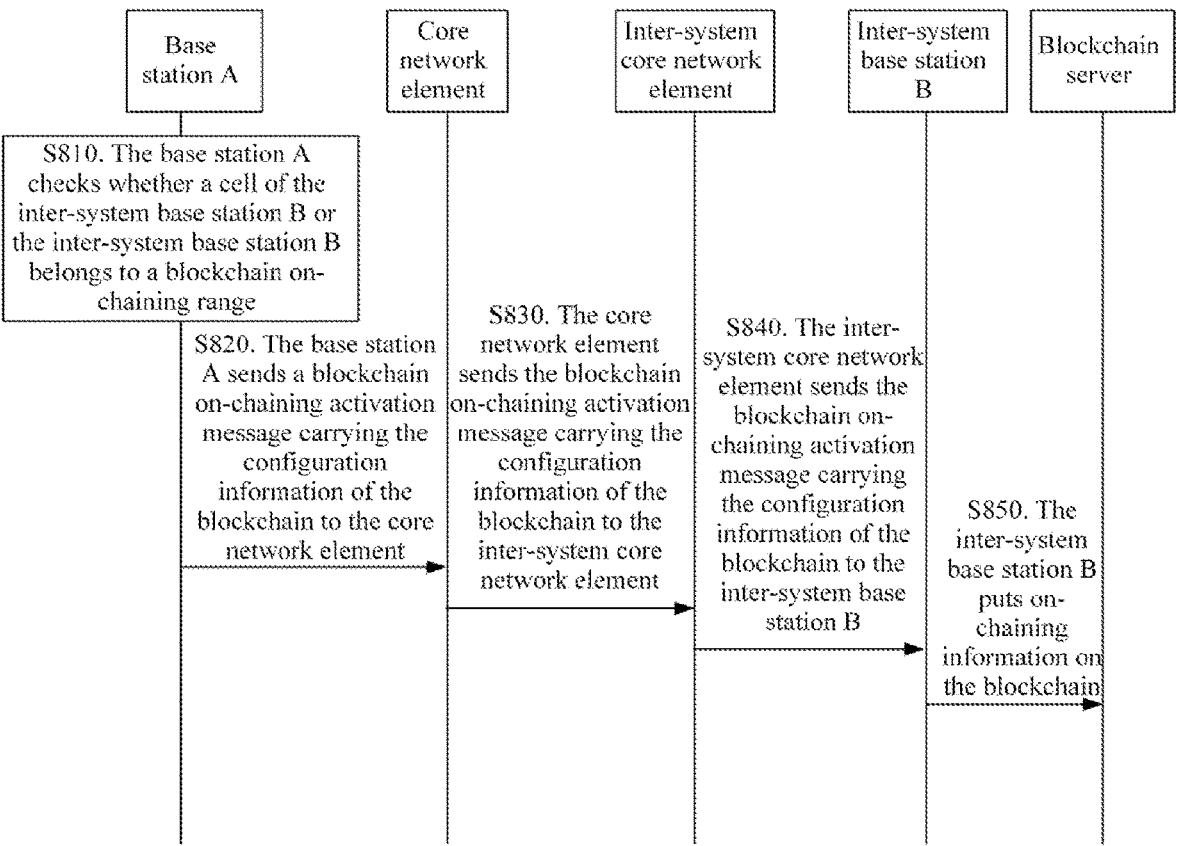
FIG. 8 is a schematic diagram of interaction of blockchain on-chaining in a cross-system scenario according to an embodiment of the present application.

In an embodiment, FIG. 8 is a schematic diagram of interaction of blockchain on-chaining in a cross-system scenario according to an embodiment of the present application. In this embodiment, the process of the interaction of blockchain on-chaining in a scenario where the terminal is recovered from the RRC idle state is described below using an example where the first network element is an inter-system base station B, the second network element is a base station A and the second-type communication node is a terminal. As shown in FIG. 8, this embodiment includes S810 to S850.

In S810, the base station A checks whether a cell of the inter-system base station B or the inter-system base station B belongs to a blockchain reporting range.

In this embodiment, for the explanation of S810, reference may be made to the description of S310 in the preceding embodiments, and details will not be repeated here.

In S820, the base station A sends a blockchain on-chaining activation message carrying configuration information of the blockchain to the core network element.

In an embodiment, the blockchain on-chaining activation message may use an inter-base station interface message such as an S1 interface message or an NG interface message, and may also use a new message. For example, if the blockchain on-chaining activation message only contains that the type is a base station, such a message may be delivered using a cross-system inter-base station information; if the blockchain on-chaining activation message contains that the type at least is a terminal, messages such as a cross-system handover request message or a handover request response message may be used.

In S830, the core network element sends the blockchain on-chaining activation message carrying the configuration information of the blockchain to the inter-system core network element.

In an embodiment, the blockchain on-chaining activation message may be delivered using an inter-system core network element interface message.

In S840, the inter-system core network element sends the blockchain on-chaining activation message carrying the configuration information of the blockchain to the inter-system base station B.

In an embodiment, the blockchain on-chaining activation message may use an inter-base station interface message such as an S1 interface message or an NG interface message, and may also use a new message.

In S850, the inter-system base station B puts on-chaining information on the blockchain.

In this embodiment, for the explanation of S850, reference may be made to the description of S350 in the preceding embodiments, and details will not be repeated here.

Figure 9:
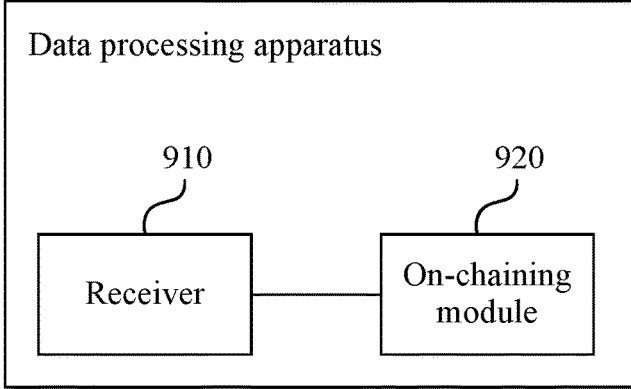
FIG. 9 is a block diagram of a data processing apparatus according to an embodiment of the present application.

In an embodiment, FIG. 9 is a block diagram of a data processing apparatus according to an embodiment of the present application. This embodiment is applied by a first network element. As shown in FIG. 9, the data processing apparatus in this embodiment includes a receiver 910 and an on-chaining module 920.

The receiver 910 is configured to receive configuration information of the blockchain from a second network element.

The on-chaining module 920 is configured to put collected on-chaining information on the blockchain according to the configuration information of the blockchain.

In an embodiment, the data processing apparatus applied in the first network element further includes a generator and a sender.

The generator is configured to generate data on-chaining success indication information.

The sender is configured to send the data on-chaining success indication information to a server that initiates a blockchain on-chaining session or a node that initiates a blockchain on-chaining session.

In an embodiment, the configuration information of the blockchain includes one of the following parameters:

a blockchain on-chaining service type;

the blockchain reporting range;

a blockchain on-chaining service content;

a blockchain on-chaining session identity;

a blockchain on-chaining format;

a blockchain server IP address list and/or a blockchain node list;

a correspondence between a blockchain server device identity or a blockchain server address and on-chaining information; and a server IP address that initiates a blockchain on-chaining session or a node that initiates the blockchain on-chaining session.

In an embodiment, the blockchain reporting range includes one or a combination of the following parameters: a cell list, a TA list, a TAI list, a network slicing list, and a RAT type.

In an embodiment, in a case where the blockchain on-chaining service type is a first-type communication node, the blockchain on-chaining service content includes one or a combination of the following: cell load information, a cell spectrum utilization rate, and the number of second-type communication nodes.

In an embodiment, in a case where the blockchain on-chaining service type is a second-type communication node, the blockchain on-chaining service content includes one or a combination of the following:

an RSRP or RSRQ measured by the second-type communication node;

an uplink delay measured by the second-type communication node;

an uplink packet loss rate measured by the second-type communication node;

a PRB resource that is occupied by the second-type communication node and that is measured by a first-type communication node;

an uplink and downlink message delay of the second-type communication node measured by the first-type communication node;

an uplink and downlink packet loss rate of the second-type communication node measured by the first-type communication node;

a throughput efficiency of the second-type communication node measured by the first-type communication node; and a total uplink and downlink data amount of the second-type communication node measured by the first-type communication node.

In an embodiment, the blockchain on-chaining format includes one or a combination of the following parameters: an information on-chaining frequency, an on-chaining information format, an on-chaining block size, and an on-chaining encryption key.

The data processing apparatus provided in this embodiment is configured to implement the data processing method applied by the first network element in the embodiment shown in FIG. 1. The implementation principles and effects of the data processing apparatus provided in this embodiment are similar to those of the method, and details will not be repeated here.

Figure 10:
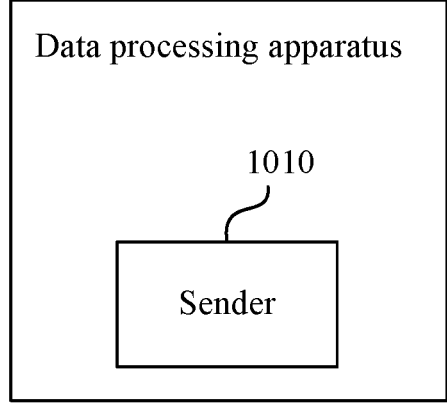
FIG. 10 is a block diagram of another data processing apparatus according to an embodiment of the present application.

In an embodiment, FIG. 10 is a block diagram of another data processing apparatus according to an embodiment of the present application. The embodiment is applied by a second network element. As shown in FIG. 10, the data processing apparatus in this embodiment includes a sender 1010.

The sender 1010 is configured to send pre-configured configuration information of the blockchain is sent to a first network element.

In an embodiment, the data processing apparatus applied in the second network element further includes: a determination module, which is configured to, before the pre-configured configuration information of the blockchain is sent to the first network element, determine whether a destination cell of a second-type communication node is within a blockchain reporting range.

In an embodiment, the sender 1010 is configured to perform the following processes.

In a case where the destination cell of the second-type communication node is within the blockchain reporting range, the pre-configured configuration information of the blockchain is sent to the first network element.

In an embodiment, the configuration information of the blockchain includes one of the following parameters:

a blockchain on-chaining service type;

the blockchain reporting range;

a blockchain on-chaining service content;

a blockchain on-chaining session identity;

a blockchain on-chaining format;

a blockchain server IP address list and/or a blockchain node list;

a correspondence between a blockchain server device identity or a blockchain server address and on-chaining information; and a server IP address that initiates a blockchain on-chaining session or a node that initiates the blockchain on-chaining session.

The data processing apparatus provided in this embodiment is configured to implement the data processing method applied by the second network element in the embodiment shown in FIG. 2. The implementation principles and effects of the data processing apparatus provided in this embodiment are similar to those of the method, and details will not be repeated here.

Figure 11:
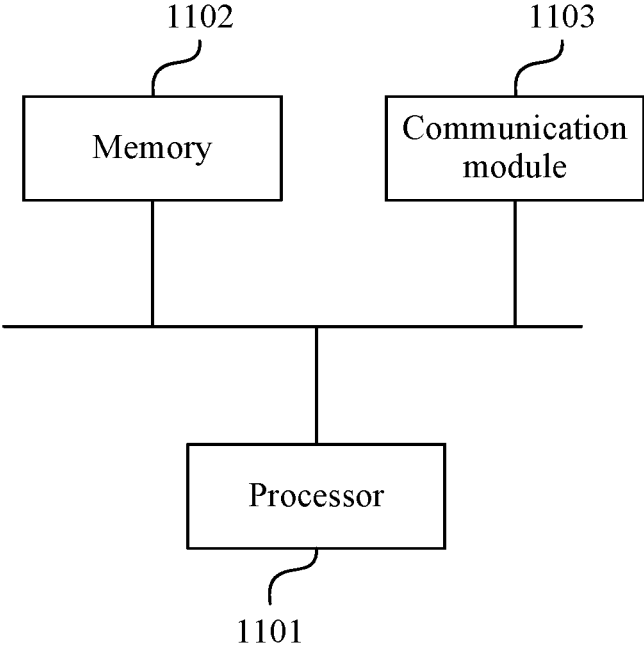
FIG. 11 is a structural diagram of a data processing device according to an embodiment of the present application.

In an embodiment, FIG. 11 is a structural diagram of a data processing device according to an embodiment of the present application. As shown in FIG. 11, the device provided in this application includes a processor 1101, a memory 1102 and a communication module 1103. The number of processors 1101 in the device may be one or more, and one processor 1101 is illustrated as an example in FIG. 11. The number of memories 1102 in the device may be one or more, and one memory 1102 is illustrated as an example in FIG. 11. The processor 1101, the memory 1102 and the communication module 1103 in the device may be connected via a bus or in other manners, and the connection via the bus is illustrated as an example in FIG. 11. In this embodiment, the device may be a first network element.

As a computer-readable storage medium, the memory 1102 may be configured to store software programs and computer-executable programs and modules such as program instructions/modules (for example, the receiver 910 and the on-chaining module 920 in the data processing apparatus) corresponding to the device in any one of the embodiments of the present application. The memory 1102 may include a program storage region and a data storage region. The program storage region may store an operating system and an application program required by at least one function, and the data storage region may store data created depending on the use of the device. In addition, the memory 1102 may include a high-speed random-access memory and may also include a non-volatile memory such as at least one disk memory, flash memory or another non-volatile solid-state memory. In some examples, the memory 1102 may further include memories located remotely relative to the processor 1101, and these remote memories may be connected to the equipment via a network. Examples of the preceding network include, but are not limited to, the Internet, an intranet, a local area network, a mobile communication network, and a combination thereof.

The communication module 1103 is configured to perform communication interaction among nodes.

In a case where the data processing device is a first network element, the device provided above may be configured to execute the data processing method applied by the first network element in any one of the preceding embodiments and has corresponding functions and effects.

In a case where the data processing device is a second network element, the device provided above may be configured to execute the data processing method applied by the second network element in any one of the preceding embodiments and has corresponding functions and effects.

The embodiments of the present application further provide a storage medium including computer-executable instructions. The computer-executable instructions, when executed by a computer processor, are used for executing the data processing method applied by the first network element, and the method includes: configuration information of the blockchain is received from a second network element, and collected on-chaining information is put on the blockchain according to the configuration information of the blockchain.

The embodiments of the present application further provide a storage medium including computer-executable instructions. The computer-executable instructions, when executed by a computer processor, are used for executing the data processing method applied by the second network element, and the method includes: pre-configured configuration information of the blockchain is sent to a first network element.

It is to be understood by those skilled in the art that the term "user equipment" covers any suitable type of wireless user device, for example, a mobile phone, a portable data processing apparatus, a portable web browser or a vehicle-mounted mobile station.

In general, multiple embodiments of the present application may be implemented in hardware or special-purpose circuits, software, logic, or any combination thereof. For example, some aspects may be implemented in hardware, while other aspects may be implemented in firmware or software that may be executed by a controller, a microprocessor or another computing apparatus, though the present application is not limited thereto.

The embodiments of the present application may be implemented by computer program instructions executed by a data processor of a mobile apparatus, such as in a processor entity, or by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions or may represent a combination of program steps with logic circuits, modules, and functions. A computer program may be stored in a memory. The memory may be of any type suitable for a local technical environment and may be implemented using any suitable data storage technology, such as, but not limited to, a read-only memory (ROM), a random-access memory (RAM), and an optical memory device and system (digital video disc (DVD) or compact disk (CD)). The computer-readable medium may include a non-transitory storage medium. The data processor may be of any type suitable to the local technical environment, and for example, includes, but is not limited to, a general-purpose computer, a special-purpose computer, a microprocessor, a digital signal processing (DSP), an application-specific integrated circuit (ASIC), a field-programmable gate array (FPGA), and a processor based on a multi-core processor architecture.

What is claimed is:

1. A data processing method, applied by a first network element and comprising:

receiving configuration information of a blockchain from a second network element; and putting collected on-chaining information on the blockchain according to the configuration information of the blockchain;

wherein the configuration information of the blockchain comprises a blockchain on-chaining service type and a blockchain on-chaining service content; and wherein in response to the blockchain on-chaining service type being a first-type communication node, the blockchain on-chaining service content comprises at least one of the following: cell load information, a cell spectrum utilization rate, and a number of a second-type communication node.

2. The method of claim 1, further comprising:

generating data on-chaining success indication information; and sending the data on-chaining success indication information to a server or a node that initiates a blockchain on-chaining session.

3. The method of claim 2, wherein the configuration information of the blockchain further comprises one of the following parameters:

a blockchain reporting range;

a blockchain on-chaining session identity;

a blockchain on-chaining format;

a blockchain server Internet Protocol (IP) address list and/or a blockchain node list;

a correspondence between a blockchain server device identity or a blockchain server address and the on-chaining information; and a server IP address that initiates the blockchain on-chaining session or a node that initiates the blockchain on-chaining session.

4. The method of claim 1, wherein the configuration information of the blockchain further comprises one of the following parameters:

a blockchain reporting range;

a blockchain on-chaining session identity;

a blockchain on-chaining format;

a blockchain server Internet Protocol (IP) address list and/or a blockchain node list;

a correspondence between a blockchain server device identity or a blockchain server address and the on-chaining information; and a server IP address that initiates the blockchain on-chaining session or a node that initiates the blockchain on-chaining session.

5. The method of claim 4, wherein the blockchain reporting range comprises at least one of the following parameters: a cell list, a tracking area (TA) list, a tracking area identity (TAI) list, a network slicing list, and a radio access technology (RAT) type.

6. The method of claim 4, wherein the blockchain on-chaining format comprises at least one of the following parameters: an information on-chaining frequency, an on-chaining information format, an on-chaining block size, and an on-chaining encryption key.

7. The method of claim 1, wherein in response to the blockchain on-chaining service type being a second-type communication node, the blockchain on-chaining service content comprises at least one of the following:

reference signal received power (RSRP) or reference signal received quality (RSRQ) measured by the second-type communication node;

an uplink delay measured by the second-type communication node;

an uplink packet loss rate measured by the second-type communication node;

a physical resource block (PRB) resource that is occupied by the second-type communication node and that is measured by a first-type communication node;

an uplink and downlink message delay of the second-type communication node measured by the first-type communication node;

an uplink and downlink packet loss rate of the second-type communication node measured by the first-type communication node;

a throughput efficiency of the second-type communication node measured by the first-type communication node; and a total uplink and downlink data amount of the second-type communication node measured by the first-type communication node.

8. A non-transitory storage medium storing a computer program, wherein the computer program, when executed by a processor, implements the method of claim 1.

9. A data processing method, applied by a second network element and comprising:

sending pre-configured configuration information of a blockchain to a first network element, to enable the first network element to put collected on-chaining information on the blockchain according to the configuration information of the blockchain;

wherein the configuration information of the blockchain comprises a blockchain on-chaining service type and a blockchain on-chaining service content; and wherein in response to the blockchain on-chaining service type being a first-type communication node, the blockchain on-chaining service content comprises at least one of the following: cell load information, a cell spectrum utilization rate, and a number of a second-type communication node.

10. The method of claim 9, before sending the pre-configured configuration information of the blockchain to the first network element, further comprising:

determining whether a destination cell of a second-type communication node is within a blockchain reporting range.

11. The method of claim 10, wherein sending the pre-configured configuration information of the blockchain to the first network element comprises:

in response to the destination cell of the second-type communication node being within the blockchain reporting range, sending the pre-configured configuration information of the blockchain to the first network element.

12. The method of claim 9, wherein the configuration information of the blockchain further comprises one of the following parameters:

the blockchain reporting range;

a blockchain on-chaining session identity;

a blockchain on-chaining format;

a blockchain server Internet Protocol (IP) address list and/or a blockchain node list;

a correspondence between a blockchain server device identity or a blockchain server address and on-chaining information; and a server IP address that initiates a blockchain on-chaining session or a node that initiates the blockchain on-chaining session.

13. A data processing device, applied in a second network element and comprising a communication module, a memory, and at least one processor; wherein the communication module is configured to perform communication interaction among a plurality of nodes;

the memory is configured to store at least one program; and the at least one program, when executed by the at least one processor, enables the at least one processor to implement the method of claim 9.

14. A non-transitory storage medium storing a computer program, wherein the computer program, when executed by a processor, implements the method of claim 9.

15. A data processing device, applied in a first network element and comprising a communication module, a memory, and at least one processor; wherein the communication module is configured to perform communication interaction among a plurality of nodes;

the memory is configured to store at least one program; and the at least one program, when executed by the at least one processor, enables the at least one processor to implement:

receiving configuration information of a blockchain from a second network element; and putting collected on-chaining information on the blockchain according to the configuration information of the blockchain;

wherein the configuration information of the blockchain comprises a blockchain on-chaining service type and a blockchain on-chaining service content; and wherein in response to the blockchain on-chaining service type being a first-type communication node, the blockchain on-chaining service content comprises at least one of the following: cell load information, a cell spectrum utilization rate, and a number of a second-type communication node.

* * * * *